United States Patent [19]

Yoshikawa et al.

[11] 3,901,638
[45] Aug. 26, 1975

[54] APPARATUS FOR PRODUCING BIAXIALLY STRETCHED RECEPTACLES BY BLOW MOLDING

[75] Inventors: Shinsuke Yoshikawa; Yuji Sawa, both of Iwaki, Japan

[73] Assignees: Kureha Kagaku Kogyo K.K.; Mitsui Toatsu Chemicals, Inc., both of Tokyo, Japan

[22] Filed: Apr. 19, 1974

[21] Appl. No.: 462,561

Related U.S. Application Data
[62] Division of Ser. No. 367,927, June 7, 1973.

[30] Foreign Application Priority Data
June 7, 1972 Japan.................................. 47-56101

[52] U.S. Cl..................425/326 B; 425/387 B; 425/DIG. 212; 425/DIG. 213
[51] Int. Cl............................................ B29d 23/03
[58] Field of Search............ 425/326 B, 387 B, 289, 425/DIG. 213, DIG. 212, DIG. 216, DIG. 211

[56] References Cited
UNITED STATES PATENTS
3,507,005  4/1970  Wiley et al...................... 425/387 B
3,525,123  8/1970  Cines et al. ...................... 425/326 B
3,596,315  8/1971  Yoshikawa et al. ................ 425/326
3,752,629  8/1973  Gordon...................... 425/DIG. 212
3,765,813  10/1973  Moore........................ 425/DIG. 213
3,790,319  2/1974  Hudson et al................... 425/387 B

*Primary Examiner*—Al Lawrence Smith
*Assistant Examiner*—Robert C. Watson
*Attorney, Agent, or Firm*—Sughrue, Rothwell, Mion, Zinn and Macpeak

[57] ABSTRACT

A blow molding apparatus for forming receptacles is disclosed wherein a tubular parison is heated in a furnace, transferred to a delivery rotary, rotated to a position adjacent a stretching rotary, transferred to the stretching rotary and longitudinally stretched while being rotated on the stretching rotary. The stretched parison is then tranferred to a molding rotary and blow molded while being rotated therewith. The stretching means dispose of the flash at a predetermined point of its rotation.

9 Claims, 19 Drawing Figures

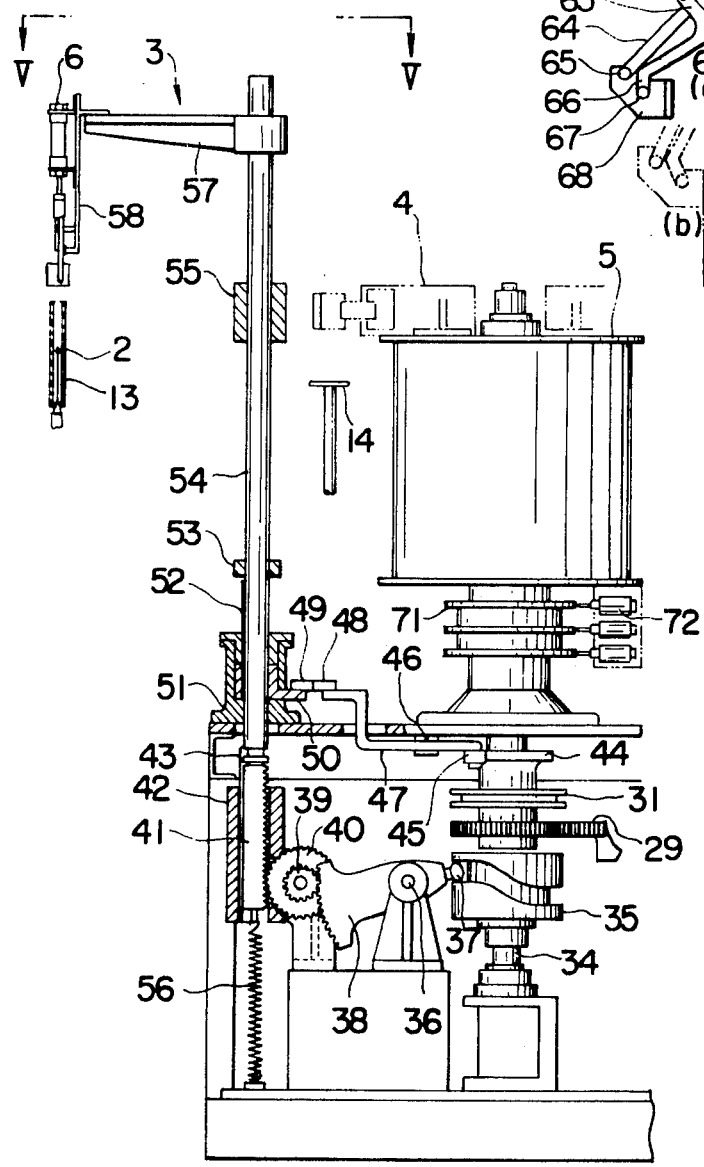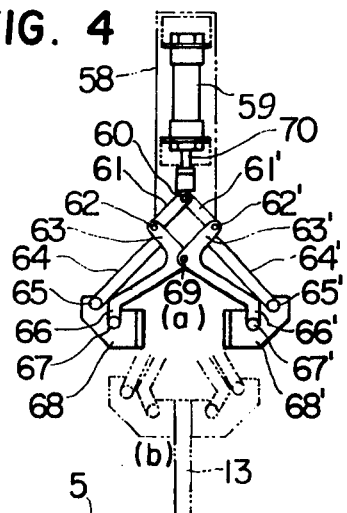

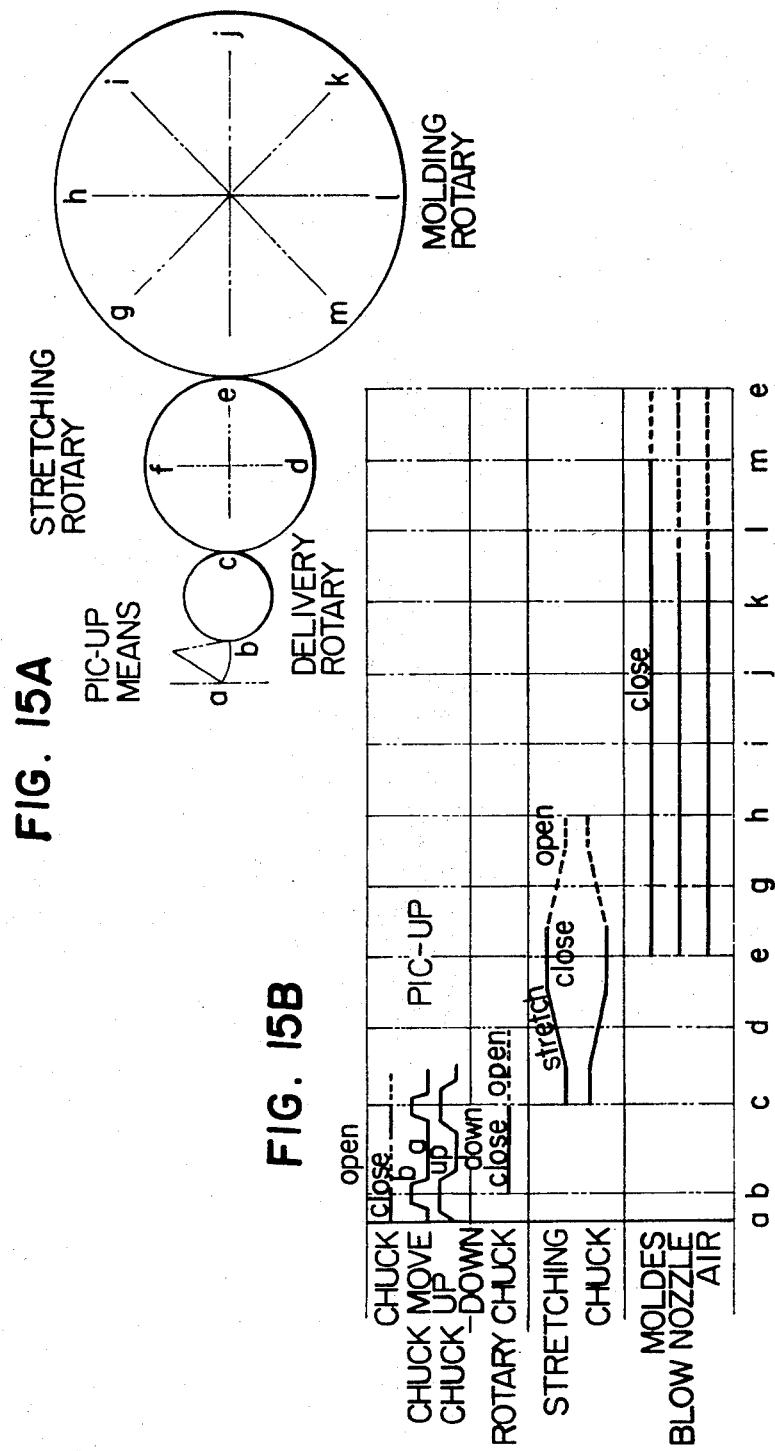

APPARATUS FOR PRODUCING BIAXIALLY STRETCHED RECEPTACLES BY BLOW MOLDING

This is a division of application Ser. No. 367,927, filed June 7, 1973.

BACKGROUND OF THE INVENTION

1. Field of the Invention

This invention relates to a novel and improved apparatus for producing a synthetic resin receptacle with good efficiency by longitudinally stretching a synthetic resin tube being in a stretching temperature region, and then blow molding it to form a biaxially stretched receptacle.

2. Description of the Prior Art

The blow molding of synthetic resins to form receptacles has previously been performed by two methods, one called the hot parison method which involves forming a resin into a tubular form by an extruder or injection molding machine and blow molding it while it is in the molten state, and the other called the parison method which involves forming the resin into a tubular or bubble form (sometimes in the form of a flat plate), cooling the formed article, again heating it to melt it, and blow molding it while it is in the molten state. In recent years, the biaxial stretching blow method which comprises heating a parison once cooled to a stretching temperature, stretching it in the longitudinal direction, and then blow molding it has been used to form receptacles of vinylidene chloride resins or polypropylene resins in order to improve the physical properties of the product such as falling strength or transparency, as a result of strong stretching and orientation and thus to utilize the inherent properties of the resins more effectively.

U.S. Pat. No. 3,541,189 discloses a basic method of blow molding which comprises extruding a thermoplastic resin into a tubular form, cooling the formed article, longitudinally stretching it in an orientation temperature region ranging from the second order transition point to the melting point of the resin, and then blow molding it in a mold.

With polyvinylidene chloride, the stretchable and moldable temperature range is near room temperature, and therefore, it is easy to form it continuously into a tubular shape by extruding from an extruder, cool the extrudate, and blow mold it at an elevated temperature. For example, as is disclosed in U.S. Pat. No. 3,541,189, a resin tube (to be called a parison) is withdrawn laterally from a take-up device and cut into a predetermined length. The cut parison is held by a mold clamp with a plurality of molds arranged in series. A nozzle is inserted into the parison, and the parison is blow molded with the bottom being heat fused by high frequency induction heating, for example. However, in the case of polypropylene whose optimum drawing temperature is 140° to 170°C., that is, near the melting temperature, a continuous method comprising cooling the extruded parison and then heating it to a drawing temperature requires a large-sized apparatus, and is not feasible. It is necessary therefore to cool the parison, cut it to a predetermined length, and then heat it by another method, for example, by heating in a blast heating furnace. It is not rational to consider the required equipment in the same domain as the molding apparatus for vinylidene chloride resin described above. Accordingly, a molding machine similar to that used in the cold parison method should be employed.

As the cold parison method comprising heating a parison cut to a predetermined length to the melting temperature in a blast heating furnace, and placing it directly in a mold, followed by molding it.

In recent years, a method which involves biaxially stretching a resin such as polypropylene was proposed. Specifically, this method is performed on an apparatus including a heating furnace for heating a tubular parison while allowing it to erect on a perpendicular pin, a set of stretching devices and a set of molds, and comprises heating the tubular parison in the heating furnace to the stretching temperature, withdrawing its top by means of a holding member, moving it to the positions of the molds, allowing it to descend, molding the lower end of the parison by holding it with a mouthportion forming mold, simultaneously raising the holding member to stretch the parison in the longitudinal direction, closing the molds on the stretched parison, and blow molding it. However, such a method has at least the following defects.

First of all, the apparatus required for performing this method is complicated. Secondly, this method requires a stretching device and a set of molds, and is not suitable for mass production because it requires at least 6 seconds per cycle. Thirdly, the stretching is carried out in one direction, and when longitudinal stretching is carried out, non-uniformity tends to occur in the longitudinal direction.

Another method involves a first step of forming a parison by an extruder, continuously cooling it, reheating it, stretching it in the longitudinal direction, cooling it, and cutting it, and a second step of reheating it while it is held by chucks (because it will shrink in the longitudinal direction on re-heating), and blow molding it while being held by molds. However, this method suffers from at least the following defects.

Firstly, since the extruded parison is cooled and then heated in order to obtain a parison of a predetermined length which has been stretched longitudinally, the apparatus becomes very large in length and it is especially difficult to obtain parisons of large thickness. Secondly, it is necessary to hold the longitudinally stretched parison during re-heating in order not to allow it to shrink. The apparatus for achieving this end is complex and large-sized, and costly. Thirdly, the yield of the resin is poor. Thus, the commercial practice of this method encounters various problems.

Accordingly, in order to produce a receptacle by biaxially stretching and blow molding a resin that must be heated to the stretching temperature of about 140° to 170°C., such as polypropylene, a molding method and apparatus of greater simplicity and performance than the conventional techniques are necessary.

SUMMARY OF THE INVENTION

The present invention provides an apparatus for blow molding a parison to form receptacles, which comprises heating a tubular parison out to a predetermined length in a heating furnace, pulling out the parison from a supporting rod, holding the central part of the parison perpendicularly, transferring it by a horizontally rotating rotary, holding both ends of said parison in the perpendicular state with a stretching device arranged on the circumference of an adjacent horizontally rotating rotary and stretching it in both directions at equal speeds while moving continuously, holding the stretched parison in the perpendicular state with molds arranged on the circumference of an adjacent another horizontally rotating rotary, blow molding the parison, holding a part of the molded article with a part of the molds when the molds are open and separating the molded article from the molds and letting it fall, and completely separating the portion held by the molds from the waste of the parison held by chucks of the stretching device outside the molds, at a place between the stretching rotary and the blow molding rotary, and letting the waste portion fall at a predetermined position.

The above is carried out by using an apparatus for forming a receptacle from a thermoplastic resin by the biaxial stretching and blow molding method, said apparatus comprising a parison withdrawing means for holding the upper end of a tubular parison of a predetermined length which has been heated to the stretching temperature by a heating furnace, with a holding member when it has left the furnace, and delivering it to a next step; a delivery rotary for receiving said parison by holding the central part thereof at a predetermined position while rotating it continuously, and delivering it to a next rotary; a stretching rotary adjacent to said delivery rotary wherein a stretching device equipped with two sets of upper and lower holding members holds the upper and lower ends of the parison delivered from the delivery rotary and stretches it at equal speeds in both the upward and downward directions with continuous moving thereby to stretch it longitudinally, and the stretched parison is delivered to another rotary; and a molding rotary on which circumference are arranged in a disclike configuration a plurality of sets of a pair of partitioned molds and a mold clamping device wherein said rotary includes a blade at both ends, the stretched parison is held, a nozzle is inserted to extend through the wall of the parison to expand the parison to the wall of the molds by introducing a pressurized fluid, the expanded parison is cooled and solidified, and the withdrawal of the molded article is performed by holding a part of the molded article by a part of the molds, and after opening of the molds and separating the molded article from the molds, the molded article is let fall; the parison heated to the optimum stretching temperature in the heating furnace is delivered continuously among the delivery rotary, the stretching rotary, and the molding rotary thereby to produce a biaxially stretched hollow molded article with high efficiency.

Thus, the apparatus of this invention comprises a delivery means for feeding to a molding machine a parison heated in a heating furnace while being erect on a perpendicular pin, a delivery rotary for delivering the fed parison to a stretching rotary, said stretch rotary being adapted to hold the upper and lower ends of the parison and stretch it in the upward and downward directions at equal speeds, and a molding rotary for blow molding the longitudinally stretched parison while holding it by molds and simultaneously cutting the bottom portion of the resulting receptacle, and is adapted to mold a biaxially stretched receptacle automatically while rotating these rotaries synchronously and continuously.

This will be described in greater detail. A cold parison erected on a perpendicular pin is continuously passed through a heating furnace to heat it uniformly to the optimum stretching temperature (140° to 170°C. in the case of polypropylene) during passage therethrough. A parison withdrawing device is located just above the exit of the furnace, and raises the parison while the upper end of the parison is being held by a parallel moving holding device. Halfway, it is moved sideways by an arc movement to bring it to the position where the chucks of the delivery rotary pass. The delivery rotary includes a disc which rotates horizontally and has at least one set of chucks on its periphery. The chucks are located at a position to hold the central part of the parison and can be opened and closed by the actuation of an air cylinder. A fixed stand is provided immediately below the lower end of the parison that has been moved by the withdrawing device. It is positioned so that when the holding means releases the parison, it falls to some extent and its lower end reaches this fixed stand. At the same time, the chucks of the delivery rotary which has moved continuously come and hold the central part of the perpendicular parison, and further move rotatingly. When the parison reaches a point near the stretching rotary, the upper and lower ends of the parison are held by stretching chucks, and simultaneously, the chucks of the delivery rotary are opened to release the parison, whereby the parison is delivered. The parison withdrawing means and the delivery rotary are one example of means for pulling off the parison from the perpendicular pin and delivering it to the stretching chucks. There are also other methods, such as one in which the parison withdrawing device is constructed as a rotary, and withdrawing chucks are provided on the circumference of the rotary, whereby the parison is pulled off and delivered to the delivery rotary while moving together with the perpendicular pin, or one in which without using the parison withdrawing device, the central part of the parison is directly held by the chucks of the delivery rotary and the chucks are raised while moving together with the perpendicular pin, following which the chucks are rotated and the parison is delivered to the stretching chucks. In such a case, the time required until the parison which has left the furnace is delivered to the stretching chucks becomes longer and the parison needs to be kept warm to some extent (heating).

In this embodiment, a combination of the parison withdrawing means and the delivery rotary will be described.

The stretching rotary includes a horizontal disc which rotates about a perpendicular, fixed shaft, and on the circumference of the disc, a plurality of stretching devices are provided. A fixed cam is provided concentrically therewith, which has a gradient in the upward and downward directions. Two guide rods fixed onto the rotating disc are arranged perpendicularly, and the stretching chunks which are opened and closed by an air cylinder with the guide rods as guides are close to each other by means of a spring. Since the stretching devices are rotated and the cam is fixed, the stretching chucks depart in the upward and downward directions by the cam in resistance to the spring. Near the delivery rotary, the stretching chunks come close and hold the upper and lower ends of the parison, and move it continuously in this state. Then, by the action of the fixed cam, the stretching chucks depart in the upward and downward directions, whereby the parison is drawn in the longitudinal direction at a predetermined draw ratio. When the parison reaches a point near the molding rotary, the molds which have rotated synchronously come in between the upper and lower stretching chunks, and simultaneously, the unnecessary part of the parison is cut off by blades included in the upper and lower ends of the molds. Even when the cutting is incomplete, the unnecessary portion of the parison is completely cut when the stretching rotary and the molding rotary further rotate and depart from the neighborhood of the point of contact. When the parison further proceeds and reaches a predetermined position, the stretching chucks are opened to allow the unnecessary portion to fall. The upper and lower stretching chucks deliver the forwarded parison to the molds, and upon finishing the separation of the unnecessary portion, come close to each other by the action of the spring along the cam, and reaches the position for receiving a next parison.

A disc which rotates horizontally about a perpendicular fixed shaft is also provided in the molding rotary, and around it, several molds and clamping devices therefor are provided. With continuous rotation, the molds are closed at a point near the point of contact with the stretching rotary, and receive the longitudinally stretched parison. Simultaneously, the extra unnecessary portion of the parison is cut off, and an air nozzle is inserted in the parison through its wall for blow molding. The molding rotary is revolved in this state, and when it comes to a predetermined position, air is evacuated. Then, the molds are opened and the molded article is dropped. In order to withdraw the molded article completely from the molds, the the molds are opened while they are still partly held. When the molded article comes to a position completely away from the molds, the portion which has held the molded article is opened to let the molded article fall.

The structure of the molds may be such that two sets of molds are secured to one set of clamping devices with the mouths of the receptacles facing each other, and the nozzle is inserted from the central portion thereof. Blades are provided at the bottoms of both molds. As soon as the molds hold the parison, the bottom portions are pressed, and the parison outside them is cut by the blades.

The delivery rotary, the stretching rotary and the molding rotary rotate horizontally in a synchronous manner, and the parison withdrawing device also moves synchronously. Accordingly, it is possible to perform the process of withdrawing the heated parison, delivering it to the stretching rotary, stretching it in the upward and downward directions at equal speeds, blow molding it in molds, and withdrawing the molded article from the molds at a fixed position, automatically with high efficiency.

An embodiment of this invention will be described in detail below with reference to the accompanying drawings which only illustrate one preferred embodiment of this invention.

BRIEF DESCRIPTION OF THE DRAWING

FIG. 3 is a view showing the details of a parison withdrawing device and a parison delivery rotary;

FIG. 4 is a view showing the details of the structure of a parison holding means;

FIGS. 15A and 15B show a timing diagram of the entire apparatus.

DESCRIPTION OF THE PREFERRED EMBODIMENT

Figure 1:
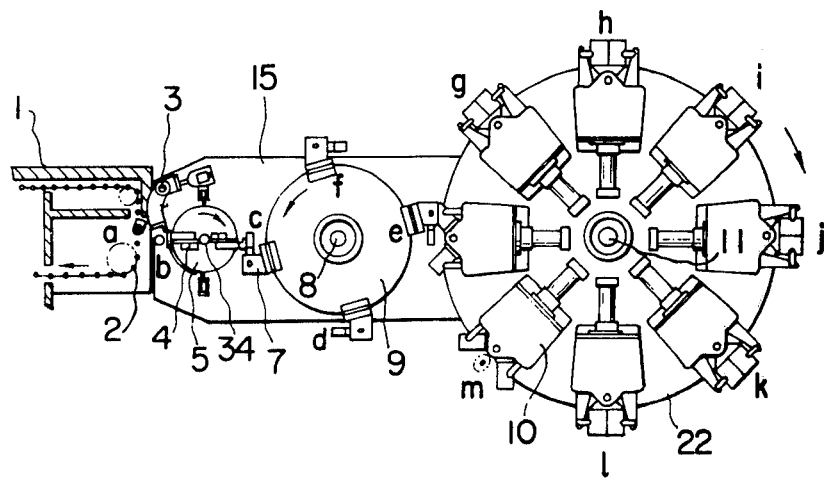
FIG. 1 is a plan showing the entire apparatus of this invention.
Figure 2:
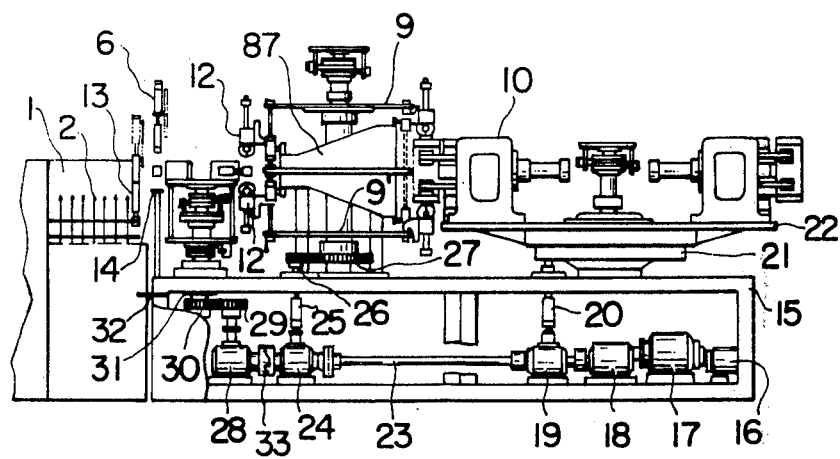
FIG. 2 is an elevation of the apparatus shown in FIG. 1.

Referring to FIGS. 1 and 2, the apparatus of this invention consists of a parison withdrawing means, a delivery rotary, a stretching rotary and a molding rotary. These rotaries are mounted on a stand 15, and rotate horizontally in a synchronous manner about perpendicular shafts 34, 8 and 11, respectively. The drive power is transmitted to a motor 16, and goes through a transmission gear 17, a reduction gear 18 and a gearbox 19 where it is transmitted to a perpendicular shaft 20 whose tip is fitted with a pinion (not shown) that rotates an internal gear 21 which then causes a table 22 to rotate. The power is further transmitted to a gearbox 24 through a joint shaft 23 extending from the gearbox 19, and by a perpendicular shaft 25, the stretching rotary is rotated through a gear 26 and a gear 27. The power is further transmitted to a gearbox 28 through a clutch 33 from the lateral shaft of the gearbox 24, and by rotating gears 29 and 30, the delivery rotary and the parison withdrawing means 3 are driven. Furthermore, the power is transmitted from a shaft 34 to which the gear 30 is also secured to a heating machine through a sprocket 31 and a chain 32. Accordingly, the entire driving of the apparatus of this invention is transmitted by the gears and the clutch 33, and therefore, the above rotaries can be operated synchronously. When a trouble occurs during the process, the clutch 33 makes it possible to rotate the heating machine 1 and the parison withdrawing means by another motor and stop the molding machine, or vice versa. The nail of the clutch 33 can be meshed only at one point of the circumference so that timing does not change.

Figure 5:
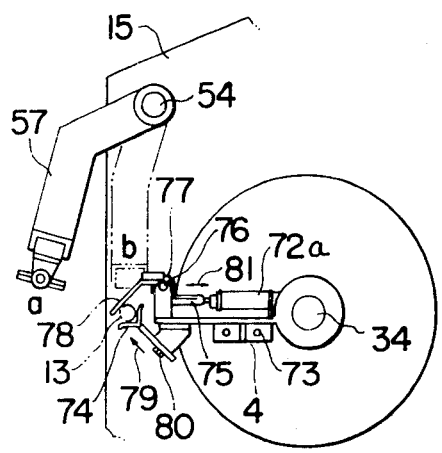
FIG. 5 is a view taken along the line V—V of FIG. 3.

When a tubular parison 13 heated by the heating machine 1 while being erected on a perpendicular pin 2 leaves the furnace and reaches a predetermined position $a$, the parison 13 is pulled out from the perpendicular pin 2 and moved to a position $b$. The details of this are shown in FIGS. 3 to 5. The shaft 34 is rotated by the power transmitted by the gear 30. The shaft 34 includes a cylindrical cam 35, and through a roller bearing 37, a sector 38 moves up and down with a pin 36 as a fulcrum. A pinion 39 meshes with the sector 38, and the speed of the sector is increased by a gear 40 which is integral with the pinion 39, thereby to vertically move a rack 41 supported by a support 42. On the other hand, when a cam 44 fixed to the shaft 34 is rotated, a lever 47 pivoted to a fulcrum pin 46 through a roller bearing 45 oscillates, and by a gear 48 secured to the end of this lever, an oscillating bracket 50 meshing with a gear 49 is reciprocated by a certain angle. The bracket 50 is supported by a support from outside, and is engaged with a moving shaft 54 extending therethrough. Since the movable shaft 54 is pivoted by a key 52, when the oscillating bracket 50 oscillates in the rotating direction, the moving shaft 54 also oscillates. The moving shaft 54 includes at its lower end a groove in the circumferential direction. A projection 43 fixed to the rack 41 comes into engagement with the groove of the moving shaft 34, and the moving shaft 51 can oscillates in the rotating direction independently of the rack 41. Moreover, the rack 41 can be moved up and down. The moving shaft 54 is supported by a bearing 55 at its upper part.

An arm 57 is secured to the upper part of the moving shaft 54, and includes a fitting plate 58 at its tip to which plate is fitted a holding means 6. Holding pieces 68 and 68' are supported by pins 65, 65', 67, 67', and one of them is pivoted to the fitting plate 58 by the pins 65 and 65', connecting plates 64 and 64', and pins 63 and 63', and the other is supported by connecting plates 66 and 66' and pins 67 and 67' pivoted to a pin 69 secured to the fitting plate 58. Pins 62 and 62' and connecting plates 61 and 61' are pivoted to a shaft 70 of an air cylinder 59 by means of a pin 60. Therefore, when compressed air is introduced into the air cylinder 59 to reciprocate the shaft 70, the holding pieces 68 and 68' move parallel from the state (a) shown in FIG. 4 to the state (b), thereby enabling it to grasp or release the parison 13.

The rising position of the holding means 6 can be adjusted by adjusting the position of the arm 57 fixed to the moving shaft 54. The amount of movement can be adjusted by a stop collar 53. In other words, when the moving shaft 54 falls down by the force of a spring 56, the stop collar 53 hits the upper end of the support 51 and stops. The groove of the cylindrical cam 35 is widened at this part so that the action of the collar is not checked by the cylindrical cam 35. Thus, the cam acts in the same way as a projected cam.

As previously stated, the parison withdrawing means 3 and the heating machine 1 are driven through the same drive source, and therefore, they move synchronously. When the heated parison comes to the position a, an electromagnetic valve (not shown) is operated by an electric signal through a timing cam 71 and a limit switch 72 to supply compressed air. Thus, by the air cylinder 59, the holding pieces 68 and 68' are closed to grasp the upper portion of the parison 13, and simultaneously, the holding means is raised by the action of the cylindrical cam 35. During this action, the parison moves from the position a to the position b by the action of the cam 44. The fixed stand 14 is located immediately below the lower end of the parison 13. When the holding pieces 68 and 68' are opened by the electrical signal and the action of the air cylinder 59 to release the parison 13 and its bottom end rides on the fixed stand 14, chunks 4 continuously rotate to grasp the central portion of the parison 13. The height at which this grasping is effected is adjusted by adjusting the fixed stand 14.

The chunks 4 (two sets) are fitted in a direction at an angle of 180° to a disc 5 which meshes with the vertical shaft 34 and rotates about a vertical axis. As is shown in FIG. 5, a fitting plate 73 is fixed to the disc 5 at right angles thereto, and a fixed holder 74 is fitted by a bolt 80 while being inclined at an angle of about 45° thereto. The adjustment can be made in a direction of arrow 79, when the diameter of the parison changes. The tip of the fixed holder 74 bifurcates, and when the parison 13 comes in between, it is held by a holding plate 78. This operation is performed as follows: A pinion 77 is fitted to one end of the holding plate 78, and a fixed pin 76 is inserted in its center to be engaged therewith. The pinion 77 meshes with a rack 75, which is moved in the direction of arrow 81 by an air cylinder 72 by an electrical signal and the switch-off of compressed air.

Accordingly, as soon as the parison 13 after continuous rotation comes into the fixed holder, the air cylinder 72 is actuated by the timing cam 71 and the limit switch 72, and the parison 13 is held by the holding plate 78 and further moved.

Figure 6:
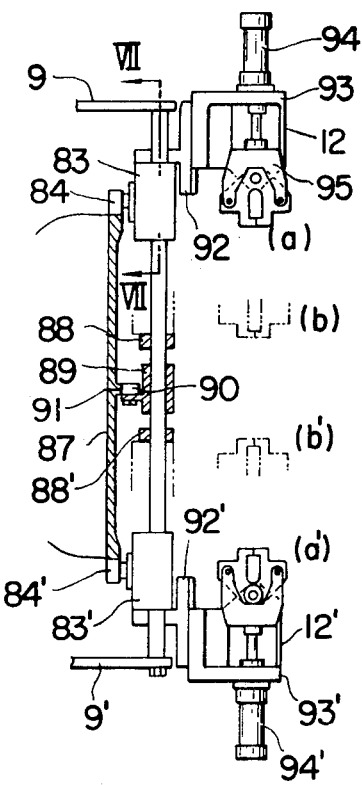
FIG. 6 is a view showing the details of a stretching device.
Figure 7:
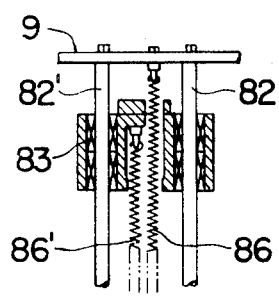
FIG. 7 is a sectional view taken along the line VII-—VII of FIG. 6.
Figure 8B:
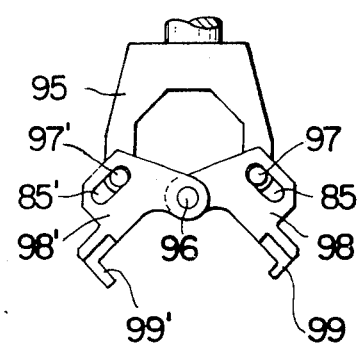
FIGS. 8A, 8B and 8C are enlarged views of stretching chucks.
Figure 8A:
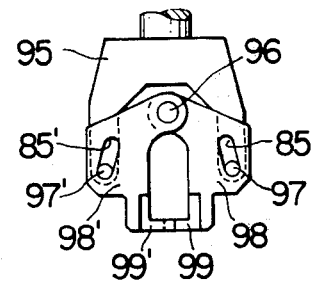

When the chunks 4 which hold the parison 13 come to the position c shown in FIGS. 1 and 6, the upper and lower ends of the parison 13 are grasped by stretching chucks 12 and 12' of the stretching devices 7 fitted to four places on the circumferences of discs 9 and 9' which are engaged with the vertical shaft 8 and rotate above a vertical axis. At the same time, the chucks 4 depart to receive the parison. The structure of each of the stretching devices 7 is shown in FIGS. 6 to 9, in which sliding brackets 83 and 83' are movable with shafts 82 and 82' connecting the discs 9 and 9' being used as guides. Springs 86' and 86 are provided between the sliding bracket 83 and the disc 9', and between the sliding bracket 83' and the disc 9, respectively. To the sliding brackets 83 and 83' are secured brackets 92 and 92', respectively, and furthermore, upper and lower adjusting brackets 93 and 93' are fitted so as to adjust the height of the bolts. The adjusting brackets 93 and 93' include therein stretching chucks 12 and 12' for grasping the parison. Since the structure of the upper part is the same as that of the lower part, the structure of the upper stretching chuck will be described by reference to FIGS. 8. Since arms 98 and 98' which open and close about a pin 96 fixed to the adjusting brackets are engaged and pins 97 and 97' secured to holding plate 95 are engaged with elongated holes 85 and 85' of the arms 98 and 98', the chucks are opened and closed as shown in FIGS. 8A and 8B respectively, by the vertical movement of the holding plate 95. The holding plate 95 moves vertically by the action of air cylinders 94 and 94' actuated by an electric signal. To the tips of the arms 98 and 98' are fixed nails 99 and 99', and as shown in FIG. 8, the parison 13 is held in a state such that it does not spread in the lateral direction. This grasping requires a considerably large force. Since the elongated holes 85 and 85' have certain angles inwardly with respect to the parallel movement of the pins 97 and 97', great force will be exerted on the jaws 99 and 99' by the action of wedge. On the other hand, the sliding brackets 83 and 83' include roller bearings 84 and 84', and when they are pulled together by springs 86 and 86', they come into contact with the upper and lower surfaces of cam 87 fixed concentrically with this rotary, and according to the shape of the cam 87, the upper and lower chucks are displaced from the positions (a), (a') to (b), (b') of FIG. 6. The distance between (b) and (b') is adjusted by stoppers 88 and 88', and the distance between (a) and (a') is adjusted between the brackets 92 and 93 and 92' and 93'.

Figure 8C:
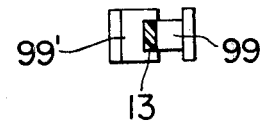
Figure 9:
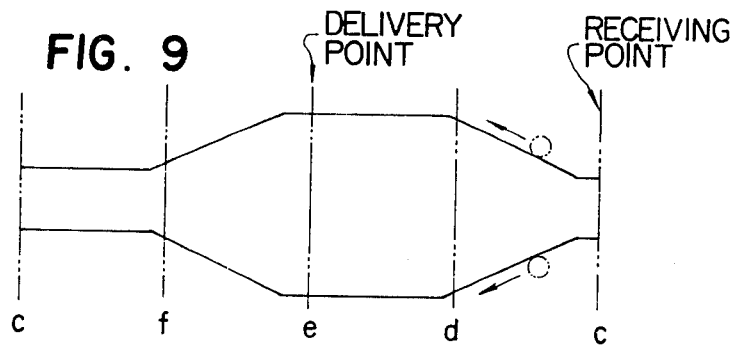
FIG. 9 is a cam diagram of a stretching rotary.

The movement of the stretching devices 7 having such a structure will be explained by FIG. 1 and FIG. 9. At position $c$ where these devices receive the parison 13, the stretching chucks 12 and 12' are located at positions ($b$), ($b'$) of FIG. 6. They grasp the upper and lower ends of the parison as shown in FIGS. 8A and 8C, while prior thereto, they are opened as shown in FIG. 8B. Since the fixed cam 87 is widened, as in FIG. 9, progressively from position $c$ towards positions $d$ and $e$, the roller bearings 84 and 84' are pushed to move apart the stretching chucks 12 and 12' thereby to stretch the parison, and then the chucks return to the positions ($a$), ($a'$) of FIG. 6. At this time, force is exerted on the nails, and the shafts 82 and 82' undergo bending force. In order to restrain this stress, this force is received by a projected portion 91 of the cam 87 through boss 89 and roller bearing 90. When the chucks reach the position $e$ while pushing the parison, the parison is held by mold clamping devices 10 rotating synchronously, and the extra portion of the parison is cut off at the upper and lower ends of the molds. Thus, the stretching chucks 12 and 12' rotate while they are holding the extra portion of the parison and are opened near the position $f$ in the state shown in FIG. 8B, thereby to let the extra portion fall down there. Since the width of the cam becomes smaller, the upper and lower chucks 12 and 12' come close to each other by the force of the springs 86 and 86', and reach the position $c$.

Figures 10A, 10B:
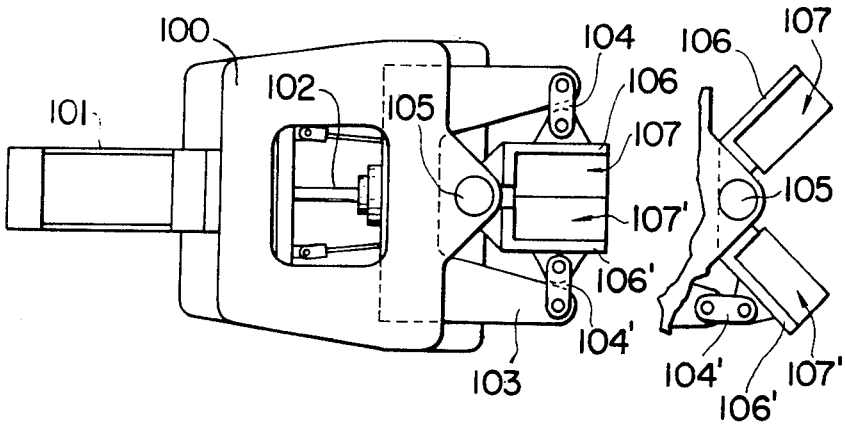
FIG. 10A and 10B are plan views of a mold clamping device.
Figure 11:
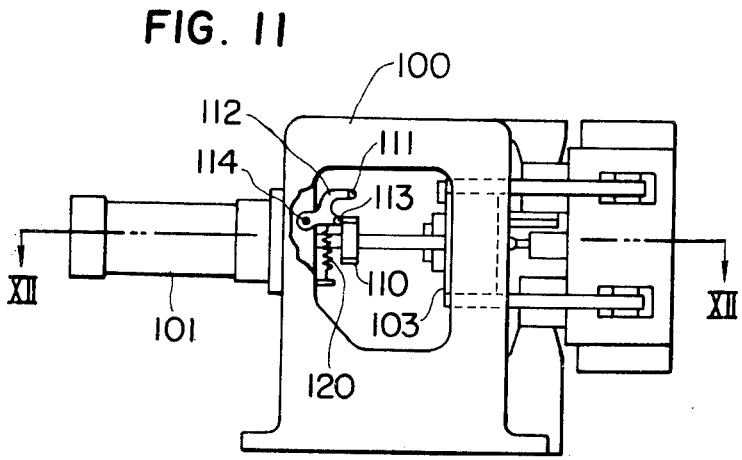
FIG. 11 is an elevation of FIG. 10.

In the molding rotary, a table 22 engaged with the vertical shaft 11 rotates about a vertical axis in the direction of the arrow at an equal speed, and on the table, eight mold clamping devices 10 are arranged circumferentially. As shown in FIGS. 10 to 13, in the mold clamping device 10, two-sectioned molds 107 and 107' are fitted perpendicularly to connecting plates 106 and 106' and can be opened and closed about a fulcrum 105 as a center. An air cylinder 101 operable by compressed air is fixed to a mounting stand 100. When the air cylinder receives an electric signal at a certain position, a fork 103 is pushed by a piston rod 102. Then, the molds 107 and 107' are closed as shown in FIG. 10A, via connecting plates 104 and 104' by being changed from the state shown in FIG. 10B. The connecting plates 104 and 104' are located at substantially right angles to the molds 107 and 107', and fixed by toggle action. After a series of operations have ended, compressed air actuates the cylinder 101 in an opposite direction by another signal, and by the pulling of the piston rod 102 and the fork 103, the molds 107 and 107' are opened.

Figure 12:
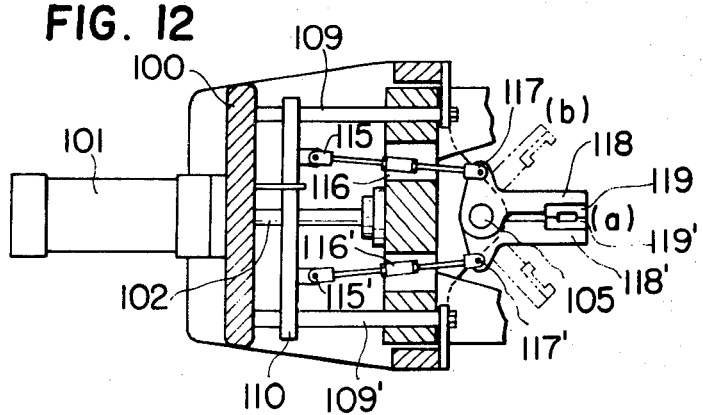
FIG. 12 is a sectional view taken along the line XII-—XII of FIG. 11 which shows the details of means for holding the resulting molded article.

When the fork 103 moves at the time of closing and opening the molds, a molded article retaining member as shown in FIG. 12 is actuated by utilizing the force of the fork 103 to let the molded article fall off from the molds. This structure will be described with reference to FIGS. 11 and 12. First the fork 103 withdraws to open the molds 107 and 107' after blow molding, and the molds are opened to some extent. When the fork 103 pushes a roller bearing 111, a bracket 112 equipped with the roller bearing 111 rotates about a fulcrum 114, secured to the mounting stand 100, as a center, whereupon a roller bearing 113 holding a moving plate 110 is disengaged upwardly, and subsequently, the fork 103 pushes the moving plate 110. Then, turn backs 116 and 116' connected by pins 115 and 115' are pulled, and arms 118 and 118' connected by pins 117 and 117' are opened with a fulcrum 105 as a center. To the forward ends of the arms 118 and 118', holding pieces 119 and 119' as part of the molds are attached, and the molded article they have held is released herein other words, the state of the arms 118 and 118' changes from ($a$) to ($b$). When the fork 103 is pushed by the piston rod 102 at the time of closing the molds 107 and 107', the arms 118 and 118' positioned at ($b$) are pushed from the back by the molds 107 and 107', whereby they are closed together.

Figure 13:
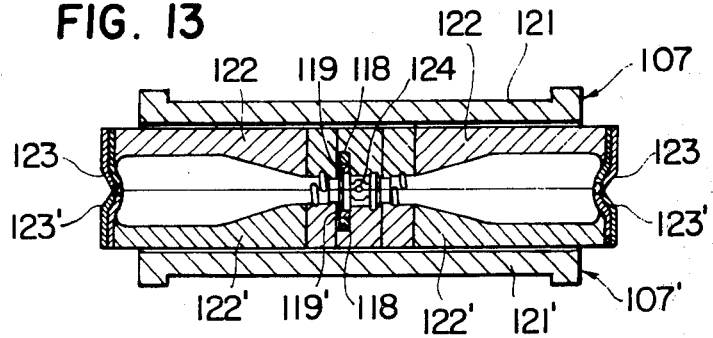
FIG. 13 is a view showing the details of the structure of the molds.

When at this time, the arms 118 and 118' begin to move from ($b$) to ($a$), the moving plate 110 is pulled by being guided by the guide rods 109 and 109' through the pins 117 and 117', the turn backs 116 and 116' and the pins 115 and 115'. Then, the roller bearing 113 is pulled by spring 120, and is situated below the moving plate 110 (the position shown in FIG. 11). Thus, even when the opening force is exerted on the holding pieces 119 and 119' by the molded article at the time of opening the molds, the roller bearing 113 becomes a stopper and does not cause the moving plate to fall down. Accordingly, the molded article is let fall from the molds. The structure of the molds 107 and 107' is such that as shown in FIG. 13, two molds are fitted to carders 121 and 121' with their mouths facing each other, and blades 123 and 123' are provided at the bottoms of half portions 122 and 122' respectively of the molds. Accordingly, the stretched parison 13 is press bonded at its bottom portion as soon as the two molds 107 and 107' are closed, and the outside portions are cut off by the blades 123 and 123'.

Figure 14:
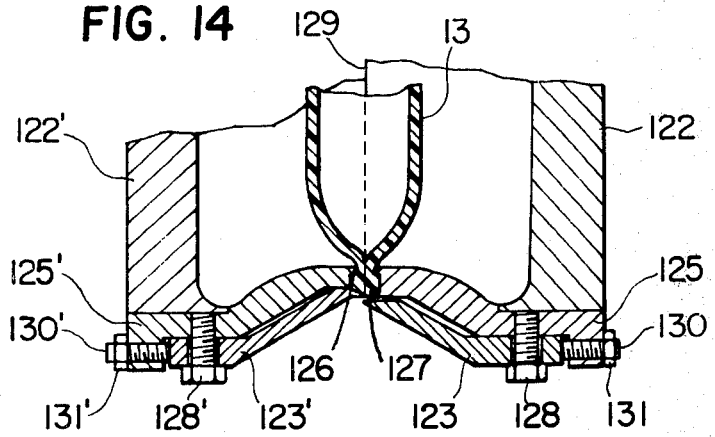
FIG. 14 is a view showing the detailed structure of the bottom of the molds.

To the bottoms of the half portions 122 and 122' as shown in FIG. 14 molds 125 and 125' are fitted with bolts, although this is not shown in this Figure. The associating portion of the bottom molds 125 and 125' has a shape such that a flange portion 126 projecting into the inside surface of the bottom of at least one mold for holding the parison 13 is provided, a depressed portion 127 is provided outwardly of it, and further blades 5 and 6 are positioned outwardly of the depressed portion 127. These blades are fixed to the bottom molds 125 and 125' by the bolts 128 and 128', but the tips of the blades are projected by a certain length (0.01 to 1.0 mm) from an associating surface 129 of the half portions 122 and 122' of the molds. In order to perform this micro adjustment, screws 130 and 130' are provided, and after determining the dimension, they are fixed with nuts 131 and 131' so as not to be deviated by the force from the blade surfaces.

The parison 13 has a high elastic recovery force (more than 70 percent elastic recovery based on the stretched length), and when molds with the associating portion being in the form of straight line, such as those used for conventional blow molding, are used, the parison shrinks as soon as the bottom burr is cut off, and tends to disengage from the molds. However, when molds of the type shown in FIG. 14 are used, the bottom portion of the parison is assuredly retained and the blow molding is performed. Subsequently to the cutting of the bottom of the parison, a blow nozzle 124 is inserted from the center of the carders 121 and 121' to introduce blow air and to perform blow molding.

When the stretched parison 13 is received near the point $e$ by the mold clamping devices 10 having the structure as described above, it is rotated in this state, and near the point $m$, the molded article is let fall by opening the molds 107 and 107'.

The detailed description of the structure of the apparatus of this invention has been made above. These rotaries are operated synchronously, and the relation is more clearly shown by the timing diagram shown in FIG. 15.

As will be seen from the above-described embodiment, the present invention has the following advantages, and makes it possible to increase the working efficiency of producing biaxially stretched receptables.

1. Since the apparatus of this invention is a blow molding machine of the rotary type, its structure is simple. In spite of using the complicated biaxial stretching blow in which to stretch a parison heated to the optimum temperature range in the longitudinal direction and then blow molding it, the molding can be effected with good efficiency while delivering the parison among the rotaries. With the apparatus shown in the embodiment, 2,400 to 3,000 receptacles per hour can be formed.

2. Since the parison heated to the optimum stretching temperature is stretched in both directions at equal speeds, the stretching irregularity in the longitudinal direction can be minimized.

3. The direction of holding the parison by stretching chucks is at right angles to the direction of opening and closing the molds. Accordingly, even when some time deviation occurs at the time of delivering the parison from the stretching rotary to the molds of the molding rotary, dispersion in the normal direction can be minimized.

4. The waste portion occurring at the bottom of the molded receptacle can be assuredly cut off and gathered at a predetermined place. Even if the cutting of the waste portion by blades contained in the upper and lower portions (bottom) of the molds should be incomplete, it is possible to cut it off completely at the parting position between the stretching rotary and the molding rotary, and let the waste fall off at a predetermined position. Thus, the scattering of the waste is reduced, and there is no fear of the molded article being injured or become indefinite in shape at the time of trimming the bottom of the molded article.

5. Since the mold clamping device includes means for withdrawing the molded article, it is possible to withdraw the molded article assuredly without damaging it, and to take it away from the molding machine.

6. If two molds are included in one mold clamping device, the cost of construction of the apparatus becomes cheaper when the apparatus has high performance.

7. When a part of the stretched parison protruded from the bottom of the mold is out off, the parison is left out from the bottom of the mold, simultaneously the stretched parison contracts. As a result of this, the stretched parison is not formed in a desired shape. However, in the present invention, the stretched parison is formed in a desired shape since the stretched parison is exactly held by the bottom of the mold having the improved shape.

While the invention has been described with reference to one embodiment, it is obvious that various changes and modifications can be made without departing from the spirit and scope of the invention.

What is claimed is:

1. An apparatus for blow molding a receptacle from a thermoplastic comprising:
   a. means to heat unstretched, individual parisons;
   b. a delivery rotary rotatable about a vertical axis, said delivery rotary having a plurality of gripping chucks attached thereto to grip and maintain said parisons in a vertical orientation as said delivery rotary rotates;
   c. transfer means to remove one parison at a time from said heating means and transfer it to one of said chucks on said delivery rotary;
   d. a stretching rotary rotatable about a vertical axis and disposed adjacent said delivery rotary;
   e. a plurality of stretching chucks attached to said stretching rotary, said stretching chucks having a portion to grip each end of each parison and remove it from said delivery rotary;
   f. stretching means attached to said stretching rotary to cause said stretching chuck portions gripping each end of said parison to move away from each other at equal speeds while said stretching rotary rotates continuously;
   g. a molding rotary rotatable about a vertical axis and disposed adjacent said stretching rotary;
   h. a plurality of molds attached to said molding rotary, each mold being separable so as to enable it to be clamped about the stretched parison, and having means to cut off the portions of the parisons gripped by said stretching chucks, and means to grip and seal the ends of the parison within the mold;
   i. means to blow mold said parison retained in said mold as said molding rotary rotates continuously; and
   j. means to synchronously drive said delivery rotary, said transfer means, said stretching rotary, and said molding rotary.

2. The apparatus of claim 1 wherein said transfer means comprises:
   a. a vertical shaft rotatable about its longitudinal axis and translatable along its longitudinal axis;
   b. means to rotate said shaft;
   c. means to translate said shaft along its longitudinal axis;
   d. an arm attached to said shaft adjacent its upper end and extending generally perpendicular thereto;
   e. a pair of holding pieces attached to the distal end of said arm, said holding pieces capable of moving toward each other to grip an upper portion of a parison; and
   f. means to selectively move said holding pieces toward each other to grip said parison.

3. The apparatus of claim 2 wherein linkage means connected to said shaft and said delivery rotary causes said shaft to rotate about its longitudinal axis.

4. The apparatus of claim 2 wherein the means to translate said shaft along its longitudinal axis comprises:
   a. a gear rack attached to the lower end of said shaft;
   b. a first gear wheel engaging said gear rack;
   c. a second gear wheel connected to said first gear wheel;
   d. a pivotable sector gear engaging said second gear wheel and having a cam follower extending therefrom;
   e. a cylindrical cam attached to said delivery rotary and in contact with said cam follower to cause said sector gear to oscillate as said delivery rotary rotates, thereby causing said shaft to translate along its longitudinal axis.

5. The apparatus of claim 1 wherein two gripping chucks are disposed on said delivery rotary spaced 180° apart.

6. The apparatus of claim 1 wherein said stretching means comprises:
   a. a cam follower attached to each portion of each stretching chuck;
   b. means to slidably attach each portion of said stretching chucks to said stretching rotary such that said portions are movable in a vertical direction; and
   c. a stationary cam positioned coaxially with said stretching rotary, and shaped such that as said stretching rotary rotates, the cam follower contact said cam to cause said portions of said stretching chucks to move away from each other at equal-speeds.

7. The apparatus of claim 6 wherein spring means are interposed between said stretching chuck portions to bias said portions toward each other.

8. The apparatus of claim 1 wherein the means attached to said mold to cut off the end portions of said parisons comprises a pair of blades, one blade attached to each end of each mold section.

9. The apparatus of claim 8 wherein the means to grip and seal ends of the parison comprises:
   a. a flange projecting laterally from each end of each mold section defining a recessed portion between the flange and the cutting blade such that when said mold sections are closed, the flanges bring the sides of the ends of the parison together in bonding relationship to seal each end, a portion of the ends of the parison being retained in said recessed portion to prevent the ends of said parison from contracting into the mold.

* * * * *